United States Patent

[11] 3,603,429

[72] Inventor Larry L. Shepherd
　　　　　　　Wickliffe, Ohio
[21] Appl. No. 55,061
[22] Filed July 15, 1970
[45] Patented Sept. 7, 1971
[73] Assignee General Motors Corporation
　　　　　　　Detroit, Mich.

[54] STEP ATTACHMENT FOR TRACTOR
2 Claims, 4 Drawing Figs.
[52] U.S. Cl. .................................................. 182/91,
　　　　　　　　　　　　　　　　　　　　　　 182/46, 280/166
[51] Int. Cl. .................................................. E06c 5/26
[50] Field of Search .................................. 182/46, 90,
　　　　　　　　　　　　　　　　　　 91, 196; 280/166, 163

[56]　　　　　　　References Cited
　　　　　　　UNITED STATES PATENTS
665,900　1/1901　Hamilton ..................... 182/90
854,753　5/1907　May ............................ 182/91
2,975,858　3/1961　Billingsley .................. 182/90

Primary Examiner—Reinaldo P. Machado
Attorneys—J. L. Carpenter and E. J. Biskup

ABSTRACT: A U-shaped step member for attachment to the frame of a tractor. The step member is molded entirely from an elastomeric material and has a foot supporting portion reinforced by a metal insert. The legs of the step member are formed as straps and, when attached to the tractor, are designed to deflect when a force is applied to the foot supporting portion along the longitudinal axis thereof but will resist deflection when a horizontally directed force is applied to the foot supporting portion along the plane of the latter and in a direction perpendicular to the longitudinal axis of the foot supporting portion.

PATENTED SEP 7 1971
3,603,429
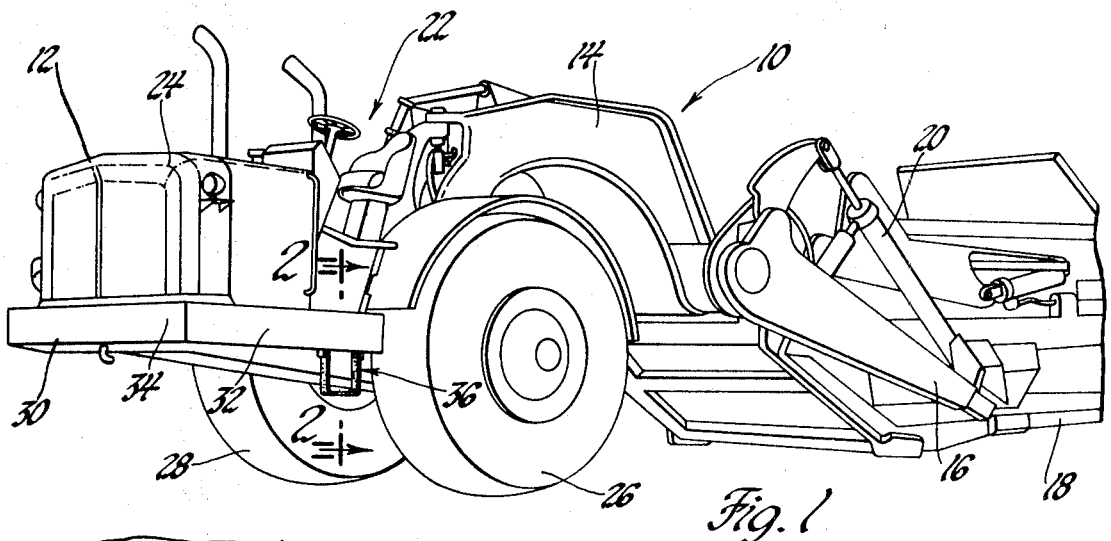
Fig. 1
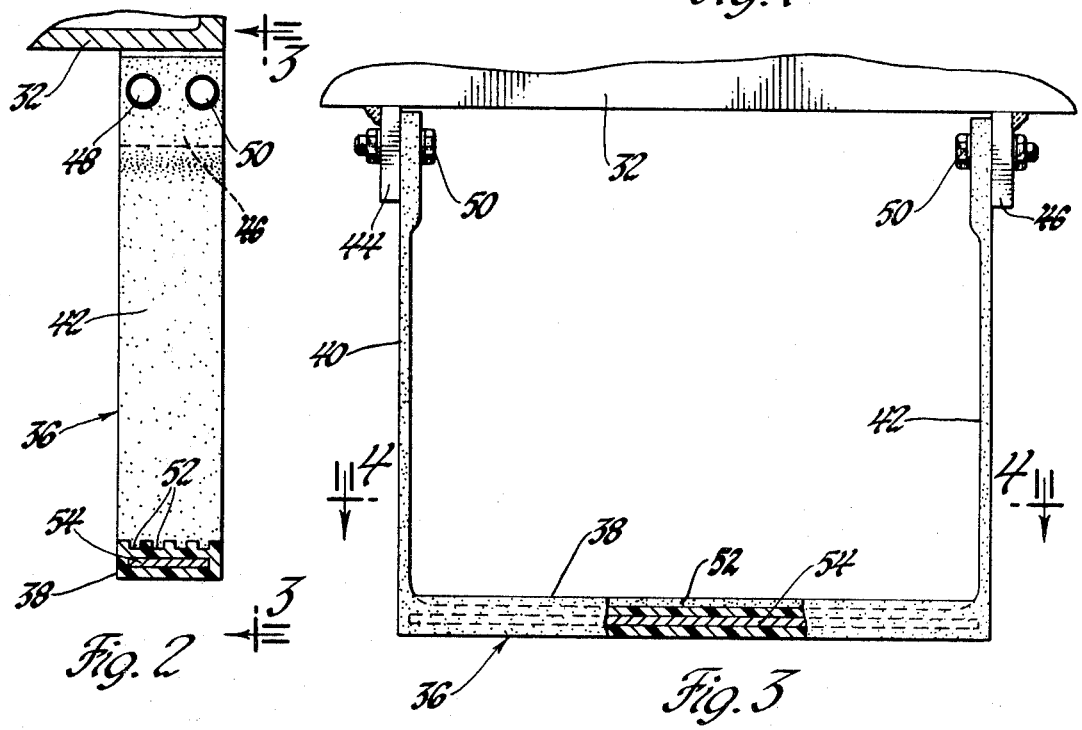
Fig. 2
Fig. 3
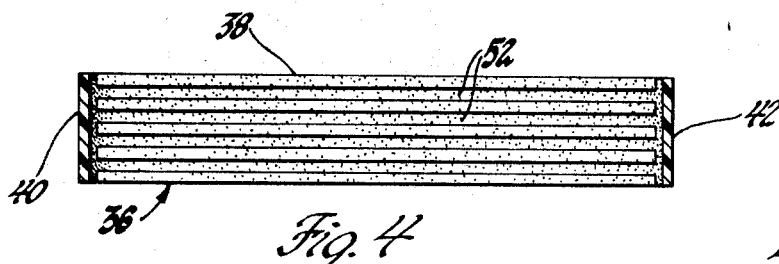
Fig. 4
INVENTOR.
Larry L. Shephard
BY
C. J. Biskup
ATTORNEY

STEP ATTACHMENT FOR TRACTOR

In recent years, the material-retaining bowl portion of the earthmoving scraper has increased in load capacity from an average of 10 cubic yards to 30 cubic yards and the trend is still upwards because of the demands of contractors for having the capability of moving greater payloads with a minimum of equipment. As a result, the tractors which pull the scraper bowls have also grown in height and size and have made it more difficult for operators to gain access to the driver's seat without having some form of steps provided on the tractor. However, because of the nature of the work performed by off-highway vehicles and the conditions under which they operate, it is imperative that there be no fragile members attached to the underside of the tractor frame or other parts of the vehicle. Therefore, any ladder or steps that may be provided for climbing to the operator's station must be made in such a way that they will not be exposed to damage as a result of the vehicle encountering boulders, ground buildups or other obstacles.

The present invention contemplates a step member which can be utilized with a tractor and more specifically is intended for use with an overhung rubber-tired tractor commonly employed with a scraper. The step member made according to the invention is adapted to be attached to a lower exposed portion of the tractor frame and is made from an elastomeric material, such as polyurethane or rubber, in a form which permits it to deflect when subjected to forces extending substantially parallel to the longitudinal axis of the scraper. In addition, the step member will resist deflection when a force is applied in a horizontal direction perpendicular to the longitudinal axis of the scraper. The latter feature permits the driver to place his shoe within the foot supporting portion of the step member and not experience any undesirable swinging movement of the latter as he climbs onto the tractor toward the operator's station.

The objects of the present invention are to provide a step member for a tractor that is formed with legs which will deflect when a force is applied to the foot supporting portion along the longitudinal axis thereof and resists deflection when a horizontally directed force is applied to the foot supporting portion along the plane of the latter and in a direction perpendicular to the longitudinal axis of the foot supporting portion; to provide a U-shaped step member made entirely from an elastomeric material and having a flat foot supporting portion provided with a metal insert for reinforcing purposes and having strap-type legs integrally formed with the ends of the foot supporting portion; and to provide a flexible step member which is generally U-shape and includes integral vertically extending straps, the upper ends of which are attachable to the underframe of a tractor and are capable of deflecting when subjected to forces directed along the width of the straps but serving to resist deflection when forces are directed along either side edge of the strap.

Other objects and advantages of the present invention will be more apparent from the following description when taken with the drawing in which:

FIG. 1 shows an overhung off-highway scraper incorporating a step member made in accordance with the invention;

FIG. 2 is an enlarged sectional view of the step member taken on line 2—2 of FIG. 1;

FIG. 3 is a view of the step member taken on line 3—3 of FIG. 2, and

FIG. 4 is a sectional view of the step member taken on line 4—4 of FIG. 3.

Referring to the drawing and particularly FIG. 1 thereof, an off-highway scraper 10 is shown including the usual overhung tractor 12 attached by a gooseneck 14 to pull arm means 16 which support a trailing scraper bowl 18 for movement between a lowered-dig position and raised-carry position as controlled by a lift cylinder 20 carried by the pull arm means. The tractor 12 has an operator's station 22 located to the rear of a power plant compartment 24 which houses the usual engine (not shown) for powering the laterally spaced drive wheels 26 and 28. A frame assembly 30 supports the engine and other components which make up the drive train and includes rigid side and front channel members respectively identified by the reference numerals 32 and 34. As should be apparent from the drawing, the size of the tractor 12 is such that the driver thereof will find it extremely difficult to get to the operator's station 22 without requiring an undue amount of physical effort. Accordingly, in order to facilitate ingress and egress, a step member 36 made in accordance with the invention is provided on the tractor 12 below the operator's station 22 and is attached to the lower portion of the longitudinally extending side channel member 32 which forms a part of the frame 30.

As seen in FIGS. 2, 3 and 4, the step member 36 is generally U-shaped and comprises a flat foot supporting portion 38, the opposite ends of which are integrally formed with vertically extending legs or straps 40 and 42. The entire step member 36 is made from an elastomeric material, such as flexible polyurethane or rubber, and has the upper ends of the legs 40 and 42 fastened to axially spaced brackets 44 and 46 rigidly secured to the channel member 32. Each of the legs 40 and 42 is fastened to the associated bracket by a pair of bolts 48 and 50 which, as seen in FIG. 2, lie in a horizontal plane and extend through appropriate apertures formed in the bracket and the upper ends of each leg.

The foot supporting portion 38 of the step member 36 is generally rectangular in configuration and has the upper surface thereof formed with elongated parallel grooves 52 so as to minimize any relative sliding movement between the driver's shoe and the foot supporting portion. In addition, it will be noted that the foot supporting portion 38 incorporates a flat steel insert or plate 54 which is also rectangular in form and is completely encapsulated within the elastomeric material of the step member. The plate 54 serves as a reinforcing member for maintaining the flat configuration of the foot supporting portion 38 even when subjected to the weight of the driver.

The lower end of each leg 40 and 42 is integrally formed with the foot supporting portion 38 and is of a width substantially greater than its thickness. As a result, each leg 40 and 42 will tend to flex or deflect when a force is applied along its width or in instances where the underside of the foot supporting portion 38 is subjected to an upward vertical force. Each leg 40 and 42, however, will resist deflection in those instances where forces are applied in a horizontal direction along either side edge of the leg. As a consequence, it should be apparent that when the scraper driver places his foot onto the foot supporting portion 38 of the step member 36 and proceeds to climb onto the tractor 12 toward the operator's station 22, the horizontal component of the load applied to the step member 36, will be resisted by both legs 40 and 42. Thus, the driver will have a firm step which will facilitate gaining access to the operator's station 22. On the other hand, during operating conditions of the scraper 10, if the tractor 12 should encounter any large obstacles which could cause damage or breakage of any part depending from the lower surface of the frame, the flexing characteristics of the step member 36 will permit the latter to absorb bending movement as explained above without breakage or damage thereto.

Various changes and modifications can be made in this construction without departing from the spirit of the invention. Such changes and modifications are contemplated by the inventor and he does not wish to be limited except by the scope of the appended claims.

I claim:

1. In a tractor having an exposed lower frame portion susceptible to encountering obstacles, a step member attached to and depending from said frame portion, said step member comprising a foot supporting portion made from an elastomeric material, a metallic plate encapsulated within said foot supporting portion and having substantially the same configuration as said foot supporting portion, a pair of straps made from said elastomeric material and having the lower ends thereof integrally formed with the opposite ends of said foot supporting portion, each of said straps having its major dimension located in a plane substantially perpendicular to the longitudinal axis of the foot supporting portion, and fastener means rigidly connecting the upper ends of said straps to said frame portion so as to allow said foot supporting portion to deflect when a force is applied along said longitudinal axis and resist swinging movement about a horizontal axis passing through the fastener means of both of said straps when a force is applied to said foot supporting portion along an axis perpendicular to said longitudinal axis.

2. In a scraper having a tractor with an exposed longitudinally extending lower frame portion susceptible to encountering obstacles, a step member made entirely from an elastomeric material and attached to and depending from said frame portion along the longitudinal axis thereof, said step member comprising a flat rectangular foot supporting portion located in a horizontal plane, a metallic plate having substantially the same configuration as said foot supporting portion encapsulated within said foot supporting portion, a pair of straps having the lower ends thereof integrally formed with the opposite ends of said foot supporting portion, each of said straps having its major dimension substantially the same as the width dimension of said foot supporting portion and located in a plane substantially perpendicular to the longitudinal axis of the foot supporting portion, and a pair of axially spaced bolts rigidly connecting the upper ends of each of said straps to said frame portion so as to allow said foot supporting portion to deflect when a force is applied thereto along the longitudinal axis thereof and resist deflection when a horizontally directed force is applied to the foot supporting portion along the plane of the latter and in a direction perpendicular to said longitudinal axis.